United States Patent Office 3,649,599
Patented Mar. 14, 1972

3,649,599
EPOXY-MODIFIED, AMINE CURABLE URETHANE RESIN AND METHOD OF MAKING SAME
Frank D. Swanson, Minnetonka, and Norm Gregornik, Minneapolis, Minn., assignors to Honeywell Inc., Minneapolis, Minn.
No Drawing. Filed Feb. 20, 1970, Ser. No. 13,198
Int. Cl. C08g 22/00
U.S. Cl. 260—77.5 AQ
25 Claims

ABSTRACT OF THE DISCLOSURE

An adduct prepared by reacting a monoepoxide and an aromatic diprimary amine in a mol ratio of no more than about 1 mol of the former per mol of the latter, is mixed with an isocyanate-containing urethane prepolymer (including a urethane polymer-forming mixture of polyisocyanate and polyol).

---

The subject matter of Example 1 was work performed in the course of or under a contract or subcontract thereunder, with the Department of the Army.

BACKGROUND OF THE INVENTION

The inclusion of an epoxide in amine-cured urethane resins has been suggested. For example, U.S. Pat. 3,158,586 discloses dissolving a diamine in a polyepoxide compound and combining the mixture with an isocyanate-containing urethane prepolymer to provide an epoxy-containing polyurethane having improved adhesive properties. U.S. Pats. 3,290,208; 3,309,261 and 3,391,054 are related but disclose a monoepoxide. Such mixtures are essentially three-component systems.

Because of the relatively high rate of reactivity of the amine with the isocyanate as compared to the low rate of reactivity between the epoxide and the amine, the epoxide remains essentially unreacted unless a high curing temperature or an unhindered amine is used. For example, if a sterically hindered amine, such as methylene bis ortho chloroaniline ("MOCA") is used, the system has good pot life but requires temperatures on the order of 250° F. to complete the epoxy-amine reaction. On the other hand, if a more reactive amine, such as methylene dianiline ("44 D"), is used, the epoxy-amine reaction proceeds at lower temperatures, such as about 160° F., but the isocyanate-amine reaction proceeds rapidly resulting in substantially immediate gelation. It is desirable that the epoxide be chemically bonded in the system to provide optimum physical properties including long term aging stability. Pats. Nos. 3,148,167 and 3,214,392 also relate to combining epoxides and polyurethanes.

It is the principal object of the present invention to provide an epoxy-modified, amine-curable polyurethane resin which can be cured at lower temperatures than heretofore and yet have a usable pot life.

It is another object of the present invention to provide an amine-curing polyurethane resin having improved adhesive properties to solid substrates, particularly to metals like steel and aluminum, by virtue of the presence of chemically bound epoxide material, and which can be cured at temperatures lower than heretofore required for such systems.

It is a further object of the present invention to provide a resin of the type described which can form adhesive bonds, particularly to metals, which will withstand prolonged exposure to moisture.

It is still another object of the present invention to provide novel amine-epoxide adducts useful as curing agents.

It is a specific object of the present invention to provide an amine-curing, epoxy-modified polyurethane resin which can be used and cured at room temperature.

Other objects, including the provision of a method of making the stated resin and the stated adducts, will become apparent from a consideration of the following specification and claims.

BRIEF SUMMARY OF THE INVENTION

In accordance with the present invention, instead of combining a mixture of the diamine and a relatively large amount of epoxide compound with the urethane prepolymer, a monoepoxide compound and an aromatic diprimary amine are reacted, in a mol ratio of from about 0.50 to about 1 mol of the former per mol of the latter, to form an adduct of said monoepoxide compound and said aromatic diamine, and this adduct is then mixed with the urethane prepolymer (including precursors of such prepolymer, i.e. a mixture of a polyol and a polyisocyanate).

The prereaction of the aromatic diamine and the monoepoxide, in the proportions described, accomplishes the more difficult reaction between the epoxide groups and the amine groups before the incorporation with the urethane prepolymer. Hence, a control over the reactions involving the system: urethane prepolymer/aromatic diprimary amine/epoxide compound, is achieved which has not been realized heretofore. The control can be exercised to the extent of providing a system that has a reasonably useful pot life and can be cured at or near room temperature through appropriate selection of aromatic diamine for the adduct and urethane prepolymer.

The epoxide compound employed in preparing the adduct is a monoepoxide, that is, it will have only one epoxide group

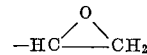

on the molecule. Other functional groups may be present on the molecule so long as they are not as reactive with the amine groups of the aromatic diprimary amine as the epoxide groups. Examples of such other functional groups are hydroxyl, silane, halogen and alkoxy. The epoxide compound may be aromatic or aliphatic, saturated or unsaturated. Typical monoepoxide compounds are allyl glycidyl ether ("AGE"); butyl glycidyl ether ("BGE"); phenyl glycidal ether ("PGE"); glycidol (2,3-epoxy-1-propanol); beta-(3,4-epoxycyclohexyl) ethyl trimethoxysilane; gammaglycidoxypropyl trimethoxysilane; glycidyl acrylate; glycidyl methacrylate; olefin oxides; cresyl glycidyl ether; and the like.

The diamine employed in preparing the adduct is aromatic in nature and contains two primary amine groups. Thus the diamine may be depicted as $H_2NR'NH_2$ where $R'$ is a divalent aromatic radical such as those having the basic structure

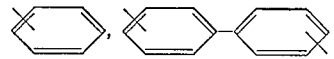

and

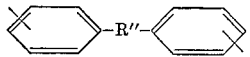

where $R''$ is a divalent radical like $-O-$, $-CH_2-$, $-C(CH_3)_2-$, $-C(X)_2$ (where X is halogen, especially chlorine or bromine) $-S-$, $-S-S-$, $-SO_2-$ and the like. The benzene rings in the foregoing formulae may be substituted by essentially inert groups like alkyl groups, alkoxy groups, chloro atoms, and the like. Typical aromatic diprimary amines are m-phenylene diamine; p-phenylene diamine; o-tolidine; cumene diamine; benzidine; dichlorobenzidine; 4,4'-methylene dianiline; diaminodiphenyl ether; 4,4' - methylene-bis-(2-chloroaniline) or methylene bis orthochloroaniline ("MOCA"); 4,4'-diamino-diphenyldisulfide ("DADPDS") 3,3' - diaminodiphenyldisulfide; 4,4' - diamino - 3,3' - dimethoxydiphenyl disulfide; 4,4' - sulfonyldianiline; 4,4' - thiodianiline; dianisidine; and the like.

The proportions of monoepoxide to aromatic diprimary amine used in preparing the adduct are subject to some variation. However, the mol ratio of monoepoxide to diamine should be at least about 0.05 mol of the former per mol of the latter and may go up to about 1 mol of the former per mol of the latter. Even at the maximum level of monoepoxide to diamine only about half of the amine groups will be reacted leaving the remainder free and uncombined for reaction with the isocyanate groups of the urethane prepolymer. As will appear from the data hereinafter set forth, at mol ratios of monoepoxide to diamine below 1:1 there is marked improvement in the final cured resin, particularly in its hardness. Thus preferred proportions have been found to range from about 0.2 to about 0.8 mols of monoepoxide per mol of diamine; with a mol ratio of from about 0.3 to about 0.5, especially about 0.4:1, being particularly advantageous.

In preparing the monoepoxide/diamine adduct, the mixture must be heated to cause the materials to combine. The principal reaction is in accordance with the equation:

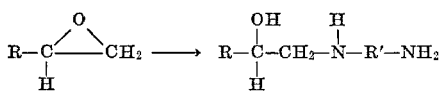

The exact temperature required depends upon the particular compounds used. For example, when sterically hindered diamines like MOCA are combined with AGE a temperature of at least 225° F., and preferably about 250° F., is required; whereas when unhindered diamines, like 4,4'-methylene dianiline, and combined with AGE a temperature as low as about 150° F. may be used. In general, the time and temperature conditions will be selected, depending upon the reactants, so that free, uncombined epoxide groups essentially disappear as determinated, for example, by infrared spectroanalysis or, more emperically, by elimination of epoxide odor. In this connection, prereacting the monoepoxide makes the final system less toxic and less volatile than a system with free monoepoxide.

In many cases, the adducts are flowable liquids at room temperature and can readily be handled as such, whereas the diamines from which the adducts are made are typically solids. As will be obvious, to the extent less than 1 mol of monoepoxide is used per mol of diamine the product will be a mixture of the adduct and unreacted diamine. However, for convenience the product, whether substantially entirely adduct (when 1 mol of monoepoxide is reacted with 1 mol of diamine) or a mixture of adduct and unreacted diamine (e.g. 40 mol percent adduct and 60 mol percent diamine when 0.4 mol of monoepoxide is reacted with 1 mol of diamine), will be referred to herein as the adduct.

To modify and cure a polyurethane resin, the adduct is mixed with an isocyanate-containing urethane prepolymer (or with the precursors thereof). Urethane prepolymers, as is will known, are the reaction products of a polyisocyanate, either aliphatic or aromatic, and a polyhydroxy terminated polyether or polyester (organic polyfunctional polyol). Typical aromatic polyisocyanates are m- and p-phenylene diisocyanates; 2,4- and 2,6-toluene diisocyanates (TDI); m- and p-xylene diisocyanates; cumene-2,4-diisocyanate; the naphthalene diisocyanates; p,p'-diphenyl diisocyanate; diphenylmethane-4,4'-diisocyanate (MDI) dianisidine diisocyanate, and the like. Typical aliphatic polyisocyanates are 1,6-hexamethylene diisocyanate; "dimeryl" diisocyanate; hydrogenated MDI; hydrogenated TDI; isophorone diisocyanate; and the like. Typical polyols are the polyalkylene ether glycols, such as polyethylene glycol, polypropylene glycol, polybutylene glycol, polyhexamethylene glycols, and the like; hydroxy-terminated polyesters, such as condensation products of a polyhydric alcohol, like ethylene glycol, propanediol-1,2 or 1,3; butanediol-1, 3 or 1,4; pentanediol-1,2 or 1,-5, diethylene glycol; triethylene glycol; dipropylene glycol; glycerol; trimethylol ethane (TME); trimethylol propane (TMP) and pentaerythritol (PE); with a polycarboxylic acid, like succinic; adipic; sebacic; malic; phthalic, malonic, oxalic; glutaric and pimelic (including their anhydrides); polyalkylene ether triols and tetrols such as reaction products of glycerol, TME, TMP, PE, or di-PE with ethylene oxide, propylene oxide or butylene oxide. The proportions of polyisocyanate and polyol are such that the product prepolymer contains free, unreacted isocyanate (NCO) groups, and urethane prepolymers have NCO contents of at least about 2.5%, by weight, based on the weight of the propolymer. Typical urethane prepolymers are the reaction product of 2,4-toluene diisocyanate and 1,4 - butylene oxide polyglycol (about 2000 M.W. and 4.1% NCO, "Adiprene" L-100, of E. I. du Pont de Nemours and Co.); polyether urethane prepolymer, 6.3% NCO ("Vibrathane" 731 of United States Rubber Co.); polyester urethane prepolymer 3.0% NCO ("Vibrathane" 6008 of United States Rubber Co.); and polyester urethane prepolymer, 7.0% NCO ("Vibrathane" 6006 of United States Rubber Co.). Instead of using the prepolymer as such, the precursors of the prepolymer, that is a polyisocyanate and a polyol may be used, in effect forming the prepolymer in situ although the reactions may be more complex. Thus, herein and in the claims reference to the prepolymer will be understood to include the equivalent mixture of the prepolymer precursors unless otherwise specificaly indicated.

Once the adduct and prepolymer (or precursors) are mixed, the mixture has a pot life which depends upon the relative reactivities of the materials. It is believed that, in addition to the reaction between any free, unreacted aromatic diprimary amine and isocyanate, there are three principal reactions involving the adduct toward crosslinking the urethane prepolymer. These are set forth below in what is believed to be the order of decreasing activity.

1. Involving primary amine groups and isocyanates:

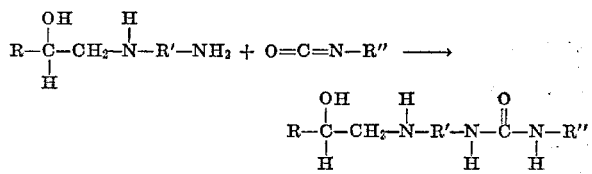

2. Involving secondary amine groups and isocyanate:

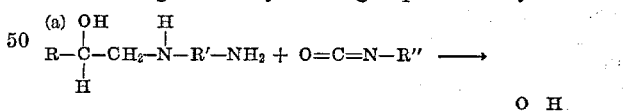

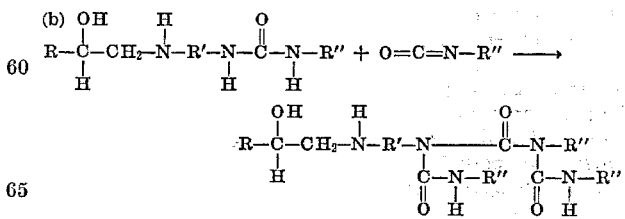

However, the actual amount of adduct used need not be just that theoretically required on a stoichiometric basis. Hardness and adhesive strength of the cured resin may be adjusted through variation in the proportion of adduct to prepolymer and the proportion of adduct used may range from about 45 to about 120% preferably from about 85 to about 110% of that stoichiometrically required based on the isocyanate content of the prepolymer and the consideration of above-mentioned reactions.

The systems of the present invention will cure at a temperature in the neighborhood of 150–175° F., but by selection of certain combinations of adduct and prepolymer it is possible to prepare a system that will have a useful pot life and cure at lower temperatures, even at or near room temperature. Thus, the diamines used to prepare the adduct, and hence the resulting adduct, have different reactivities depending largely on whether or not the amino groups are sterically hindered or act like they are. MOCA is a sterically hindered diamine and DADPDS acts similarly, and hence these amines and their adducts are relatively low in activity. Urethane prepolymers, on the other hand, have rates of activity generally in direct proportion as the NCO content thereof. It has been found that by incorporating an adduct of such a slow acting diamine, e.g. MOCA or DADPDS, with a urethane prepolymer having an NCO content of at least about 4%, the system will have a usable pot life and is curable at room temperature. Likewise, an adduct of a more reactive amine, like 4,4'-methylene dianiline or cumene diamine, can be combined with an urethane prepolymer having a lower NCO content (about 2–3%) to provide a system with a usable pot life and curable at room temperature. The use of a curing catalyst, like oleic acid or adipic acid, may be found desirable to facilitate curing of such a system at room temperature.

In the system of the present invention it is preferable, especially when retention of adhesion under high temperature or high humidity conditions is required, to incorporate an adhesion promoting silane. Such silanes are, for example, aminoalkylloweralkoxysilanes (aminosilanes) where the alkyl group contains 3–4 carbon atoms like gamma-aminopropyltriethoxysilane, and glycidoxylalkyltrialkoxysilanes (epoxysilanes) like gamma-glycidoxypropyltrimethoxysilanes. From about 0.1 to about 6%, by weight, of the silane based on the weight of the epoxy modified urethane resin may be used.

The resin systems of the present invention are useful as coatings on a wide variety of solid substrates, including synthetic resins and elastomers, glass, ceramics and metals. They are also useful as sealants and as adhesives for bonding solid substrates of the type mentioned above to each other. Depending upon the means of application, the uncured material may be dispersed or dissolved in a solvent (water-free) like a ketone (such as methyl ethyl ketone, methyl isobutyl ketone and acetone); an aromatic hydrocarbon (such as benzene, toluene and xylene); an aliphatic hydrocarbon (such as hexane and heptane); an ester (such as methyl acetate, ethyl acetate, butyl acetate and amyl acetate), and mixtures thereof. The use of a solvent may be advisable in curing the material of the present invention as a coating composition, and a solids content as low as about 10% may be used for spray application. Fillers (including pigments) may also be incorporated in the resin system of the present invention, and these may be particulate like aluminum powder or flake, carbon black, titanium dioxide, iron oxide, alumina, silica, and calcium carbonate, or fibrous like asbestos, glass fibers and aluminum silicate fibers. Generally, a filler will not make up more than about 50%, by weight, of the material (epoxy modified resin and filler).

The present invention will be more readily understood from a consideration of the following specific examples which are given for the purpose of illustration only and are not to be considered as limiting the scope of the invention in any way.

EXAMPLE 1

Two hundred and sixty-seven parts, by weight (1 mol) of methylene bis ortho chloroaniline ("MOCA") were melted at 212–228° F. and mixed with 114.4 parts (1 mol) of allyl glycidyl ether ("AGE") and 0.5 part of stannous octoate. The mixture was heated in an oven at 250° F. for 16 hours, following which the product was cooled to room temperature. Twenty parts by weight of the resulting clear amber liquid were mixed with 100 parts, by weight, of urethane prepolymer prepared by reacting 2,4-tolylene diisocyanate with a 1,4-butylene oxide polyglycol to approximately 2000 M.W., a viscosity of 14,000–19,000 cp. and 4.1% NCO ("Adiprene-L 100" of E. I. du Pont de Nemours Co.) and 1.5 parts of gamma-aminopropyltriethoxysilane. The mixture was then cast onto sandblasted cold rolled steel and acid etched aluminum and cured for 16 hours at 150° F.

Peel strengths (180°) were then measured on the materials, at room temperature as such and after immersion in water at 160° F. for 38 hours, the results were as follows (the peel strength figures being the average of 5 samples):

TABLE 1

180° peel strengths, pounds per inch

| Cold rolled steel | | Etched aluminum | |
| --- | --- | --- | --- |
| Original | After immersion | Original | After immersion |
| 39.0 | 41.6 | 34.6 | 36.0 |

The Shore $A_2$ hardness at room temperature of the cured resin was 72 (initial) and 67 (after 10 seconds), and the resin could not be penetrated with a fingernail.

EXAMPLES 2–4

The procedure of Example 1 was followed except that stannous octoate was not used in preparing the adduct and the silane was omitted from the prepolymer, and that varying mol ratios of AGE to MOCA and varying proportions of adduct to urethane prepolymer (in parts by weight of adduct per hundred parts prepolymer—"phr.") were used. Furthermore, the adduct-prepolymer mixtures were cast into aluminum dishes and cured for 18 hours at 165° F. Shore $A_2$ hardness at various temperatures (immediately upon removal from oven and at room temperature) is given in two figures; the first being the initial reading and the second being the 10 second reading. The "Cut" data refer to whether or not a fingernail could be forced into the cured resin. The results are tabulated as follows:

TABLE II

| | Example | | |
| --- | --- | --- | --- |
| | 2 | 3 | 4 |
| Mols AGE/mol MOCA | 1.0 | 0.9 | 0.8 |
| 15 phr. adduct: | | | |
| Cut at 165° F | No | No | No. |
| Shore $A_2$ at 165° F | 19/16 | 41/39 | 60/58. |
| Cut at 75° F | No | No | No. |
| Shore $A_2$ at 75° F | 35/25 | 54/47 | 68/63. |
| 17.5 phr. adduct: | | | |
| Cut at 165° F | No | No | No. |
| Shore $A_2$ at 165° F | 30/25 | 51/48 | 64/62. |
| Cut at 75° F | No | No | No. |
| Shore $A_2$ at 75° F | 40/35 | 64/56 | 73/68. |
| 20 phr. adduct: | | | |
| Cut at 165° F | No | Yes | Yes. |
| Shore $A_2$ at 165° F | 37/27 | 68/64 | 70/68. |
| Cut at 75° F | No | No | No. |
| Shore $A_2$ at 75° F | 50/40 | 74/70 | 76/72. |
| 22.5 phr. adduct: | | | |
| Cut at 165° F | Border | Yes | Yes. |
| Shore $A_2$ at 165° F | 53/50 | 69/65 | 73/72. |
| Cut at 75° F | No | No | No. |
| Shore $A_2$ at 75° F | 64/56 | 75/70 | 79/75. |
| 25 phr. adduct: | | | |
| Cut at 165° F | Yes | Yes | Yes. |
| Shore $A_2$ at 165° F | 58/54 | 70/66 | 74/74. |
| Cut at 75° F | No | No | No. |
| Shore $A_2$ at 75° F | 69/62 | 76/71 | 80/76. |

The foregoing data show that reduction of the mol ratio of monoepoxide to diamine results in a marked improvement in the hardness of the resin.

EXAMPLES 5–7

In these examples the procedure is the same as in Examples 2–4 except that different mol ratios were used; the adduct-prepolymer mixture was cast onto acid etched 6061 T6 aluminum and cured for 16 hours at 165° F., and Shore $A_2$ and "Cut" data were obtained only at room temperature (75° F.). In addition 180° peel strengths, in pound per inch, were determined at room temperature. The results are tabulated as follows:

TABLE III

| | Example | | |
|---|---|---|---|
| Mols AGE/mol MOCA | 5 | 6 | 7 |
| | 0.4 | 0.6 | 0.8 |
| 15 phr. adduct: | | | |
| Shore $A_2$ at 75° F | 80/84 | 79/77 | 69/66 |
| 180° peel | 90 | 48 | [1] 0 |
| Cut at 75° F | No | No | No |
| 17.5 phr. adduct: | | | |
| Shore $A_2$ at 75° F | 89/87 | 83/81 | 73/70 |
| 180° peel | 53 | 75 | [1] 64 |
| Cut at 75° F | No | No | No |
| 20 phr. adduct: | | | |
| Shore $A_2$ at 75° F | 90/89 | 86/84 | 77/74 |
| 180° peel | 36 | 61 | 48 |
| Cut at 75° F | No | No | No |
| 22.5 phr. adduct: | | | |
| Shore $A_2$ at 75° F | 88/86 | 70/67 | 79/77 |
| 180° peel | 38 | 40 | 63 |
| Cut at 75° F | No | No | No |

[1] Adhesion was greater than tensile strength of resin and failure occurred in resin instead of at bond line.

The foregoing data show further marked improvement in hardness with lower mol ratios. The foregoing data also show that optimum adhesion occurs at an amount of adduct near 95% of the stoichiometric amount (based on reactions #1 and #2 set forth hereinabove).

EXAMPLES 8-11

In these examples adducts were prepared from AGE to MOCA in varying mol ratios as set forth in the following Table IV. The adducts were mixed with the urethane prepolymer of Examples 1-7 in amounts (phr.) as also set forth in the table. The prepolymer also contained 1.5 parts, by weight, of gamma-aminopropyltriethoxysilane per hundred parts of prepolymer. The mixtures were then cast onto acid etched 1100 aluminum and cured for 16 hours at 150° F. Peel strengths (180°) (in p.l.i.) and Shore $A_2$ hardness (initial and 10 second readings) were determined and are tabulated as follows, the data being the averages of these samples.

TABLE IV

| | Example | | | |
|---|---|---|---|---|
| | 8 | 9 | 10 | 11 |
| Mols AGE/mol MOCA | 0.2 | 0.15 | 0.1 | 0.05 |
| Phr. adduct [1] | 13.4 | 13.2 | 12.9 | 12.3 |
| 180° peel | 37 | 40 | 35 | 34 |
| Shore $A_2$ at 75° | 90/90 | 90/90 | 91/91 | 89/89 |

[1] About 95% of stoichiometric amount.

EXAMPLES 12-19

In these examples adducts were prepared by reacting one mol of the diamine with 0.4 mol of the monoepoxide at 250° F. for 16 hours followed by cooling to room temperature. The diamine and monoepoxides were as follows:

| Example | Diamine | Monoepoxide |
|---|---|---|
| 12 | MOCA | Butyl glycidyl ether. |
| 13 | MOCA | Phenyl glycidyl ether. |
| 14 | MOCA | Glycidol. |
| 15 | MOCA | Beta-(3,4-epoxycyclohexyl) ethyl trimethoxysilane. |
| 16 | MOCA | Gamma-glycidoxypropyl trimethoxysilane. |
| 17 | DADPDS [1] | Butyl glycidyl ether. |
| 18 | DADPDS [1] | Phenyl glycidyl ether. |
| 19 | m-Phenylenediamine/ cumene diamine eutectic. | Allyl glycidyl ether. |

[1] 4,4'-diamino diphenyldisulfide.

All the foregoing adducts were liquids at room temperature.

These adducts were then mixed with various urethane prepolymers, in proportions (phr.) set forth in the following Table V (about 95% of stoichiometric value), cast onto acid etched 2024 T-3 aluminum and cured 16 hours at 150° F. After removal from the oven, the samples were allowed to cool to room temperature and 180° peel strengths were measured. The urethane prepolymers were as follows:

A—same as in Example 1
B—polyether urethane prepolymer, 6.3% NCO ("Vibrathane" 731 of United States Rubber Co.)
C—polyester urethane prepolymer, 7.0% NCO ("Vibrathane" 6006 of United States Rubber Co.)
D—polyester urethane prepolymer 3.0% NCO ("Vibrathane" 6008 of United States Rubber Co.)

The results are tabulated as follows in which the 180° peel strengths, in pounds per inch, are averages of five samples:

TABLE V

| | Urethane prepolymer | | | | | | | |
|---|---|---|---|---|---|---|---|---|
| | A | | B | | C | | D | |
| Adduct of Example— | Phr. adduct | 181° peel | Phr. adduct | 181° peel | Phr. adduct | 181° peel | Phr. adduct | 181° peel |
| 9 | 14.8 | [1] 58 | 22.8 | 58.5 | 25.3 | 73.2 | 10.8 | [1] 35 |
| 10 | 15.2 | 60 | 23.3 | [1] 68 | 25.9 | 80.4 | 11.1 | [1] 45 |
| 11 | 13.8 | 24.4 | 21.1 | 42.8 | 23.5 | 99.4 | | |
| 12 | 16.9 | 32.6 | 26.0 | 18.4 | | | | |
| 13 | 16.8 | 62.2 | 25.7 | 42.0 | | | | |
| 14 | 13.9 | [1] 20 | 21.4 | [1] 40 | 23.8 | 60.6 | | |
| 15 | 14.3 | [1] 20 | 22.0 | [1] 72 | | | | |
| 16 | 8.3 | 35.2 | | | | | | |

[1] Failure in resin at this level instead of at bond line.

When the diamines were used alone with the various urethane prepolymers under the same conditions the results were as follows:

TABLE VI

| | Urethane prepolymer | | | | | | | |
|---|---|---|---|---|---|---|---|---|
| | A | | B | | C | | D | |
| Amine | Phr. amine | 181° peel | Phr. amine | 181° peel | Phr. amine | 181° peel | Phr. amine | 181° peel |
| MOCA | 12.5 | 22 | 19.0 | 37 | 21.1 | (2) | 9.0 | 29.3 |
| DADPDS | 11.5 | (2) | 17.7 | (2) | 19.7 | (2) | | |
| MPD/CD [1] | 6.2 | (2) | | | | | | |

[1] Cures too fast to cast.
[2] m-Phenylene diamine plus cumene diamine eutectic.

EXAMPLE 20

This example illustrates the use of the diamine-monoepoxide adduct with a polyol and a polyisocyanate compound (instead of a urethane prepolymer).

The following formulations were prepared by mixing the components (parts by weight) at 75° F., casting the mixture onto acid etched 2024 T-3 aluminum and curing at 150° F. for 16 hours.

TABLE VII

| | | |
|---|---|---|
| MOCA | 13.4 | |
| MOCA AGE 0.4/1 adduct | | 16.1 |
| Polypropylene glycol (1,025 M.W.) | 51.3 | 51.3 |
| Polyisocyanate, 29.2% NCO [1] | 28.8 | 28.8 |
| Stannous octoate | 0.1 | 0.1 |
| 180° peel strength (lb./in.) | 30.0 | 52.8 |

[1] "Isoante" 143 L of Upjohn Company (structurally similar to MDI).

EXAMPLES 21 AND 22

These examples illustrate the applicability of the present invention to preparing room temperature curing resins. Adducts were prepared using 1 mol of two different diamines; MOCA and DADPDS, and 0.4 mol of allyl glycidyl ether (AGE) by heating the mixture at 250° F. for 16 hours. The adducts were then mixed with a polyether urethane prepolymer, 6.3% NCO ("Vibrathane" 731 of United States Rubber Co.), gamma-aminopropyltriethoxysilane and a small amount of adipic acid. The mixture had a pot life of about 5 minutes. The mixtures were cast onto acid-etched 2024 T-3 aluminum and allowed to stand at room temperature for 24 hours at 50% relative humidity after which 180° peel strengths and Shore $A_2$ hardness were determined.

These examples are summarized in the following Table VIII in which amounts are in parts by weight:

TABLE VIII

| | Example | |
|---|---|---|
| | 21 | 22 |
| MOCA | 267 | |
| DADPDS | | 248.4 |
| Allyl glycidyl ether | 45.76 | 45.76 |
| Adduct | 24.0 | 21.1 |
| Prepolymer | 100.0 | 100.0 |
| Gamma aminopropyltriethoxysilane | 1.5 | 1.5 |
| Adipic acid | 0.2 | 0.2 |
| 180° peel strength (p.l.i.) [1] | 26 | 24 |
| Shore $A_2$ hardness | 70 | 72 |

[1] Average of 3 samples.

Aging for three weeks at 75° F. and 50% R.H. resulted in decrease in peel strength to 15 and 16 p.l.i.; respectively. And aging for 72 hours in water at 165° F. resulted in Example 17 failing at 1.3 p.l.i. and Example 18 peeling at 8 p.l.i.

When the adipic acid was not used in the foregoing, the resin had a longer gel time at room temperature (about 1 hour) and the cured resin had a somewhat lower hardness (Shore $A_2$ hardness ranged from 30 to 50 after 24 hours at room temperature).

A sample of Example 22 bonded to acid etched 6061 T6 aluminum was buried 12 to 18" in the earth (sandy loam, north temperate zone) for six months including freeze-thaw cycles. After that time the 180° peel strength was found to be still 24 p.l.i.

EXAMPLE 23

An adduct is prepared as in Example 5 from 0.4 mol of AGE and 1 mol of MOCA, and 15 parts, by weight, of this adduct were mixed with 100 parts of the urethane prepolymer used in Examples 1–7 and 1.5 parts of gammaaminopropyltriethoxysilane. Some samples were molded as strips to measure tensile strength and elongation and hardness; others were cast onto various metals for measurement of other properties, and others were cast between two aluminum sheets for measurement of Climbing Drum Peel strength. In all cases the cure was at 150° F. for 16 hours.

Some bonded samples were aged in water at 160° F., other bonded samples were aged at 95° F. and 95% relative humidity, and other bonded samples were buried 12–18" in the earth in a tidal area where they were under salt water at high tide. Peel strengths (180°) were measured at intervals (at room temperature).

The results are tabulated as follows:

TABLE IX

| | |
|---|---|
| Tensile strength (ASTM D412), p.s.i. | 1,680 |
| Tensile elongation (ASTM D412), percent | 815 |
| Tensile shear acid etch aluminum (ASTM D1002), p.s.i. | 960 |
| Climbing drum peel (ASTM D1781), p.l.i | 57 |
| Shore $A_2$ hardness (75° F.) | 80–85 |

| | 180° peel—p.l.i. | | |
|---|---|---|---|
| 160° F. water aging | 0 hr. | 72 hr. | 120 hr. |
| 1100 aluminum (acid etched) | 30.6 | 63.0 | 72.6 |
| 1018 low carbon steel (sand blasted) | 35.3 | 44.6 | 40.0 |
| 316 stainless steel (acid etched) | 40.6 | 56.0 | 50.3 |

| | 0 wk. | 6 wk. | 3 mo. | 6 mo. | 12 mo. |
|---|---|---|---|---|---|
| Aging in earth | | | | | |
| 1100 aluminum (acid etched) | 31 | 65 | 56 | 70 | 70 |
| 1018 low carbon steel (sand blasted) | 35 | 27 | 33 | 36 | 16 |
| 316 stainless steel (acid etched) | 41 | 41 | 47 | 13 | 19 |

| | 0 wk. | 1 wk. | 2 wk. | 3 wk. to 5 mo. |
|---|---|---|---|---|
| Humidity aging (95° F.—95% R.H.) | | | | |
| 2024 aluminum (acid etched) | 27 | 37 | 52 | ([1]) |
| 6061 aluminum (acid etched) | 38 | 58.5 | 52.5 | ([1]) |

[1] Failure in resin at values of 72–80 instead of at bond line.

What is claimed is:

1. In the preparation of an epoxy-modified, diamine-curable urethane resin involving combining an epoxide compound and a diamine with an isocyanate-containing urethane prepolymer, the improvement which comprises first reacting a monoepoxide compound with an aromatic diprimary amine, in a mol ratio of from about 0.05 to about 1 mol of the former per mol of the latter, to form an adduct of said monoepoxide compound and said aromatic diamine and thereafter mixing said adduct with the urethane prepolymer.

2. The method of claim 1 wherein the mol ratio of said monoepoxide compound to said aromatic diprimary amine is from about 0.2 to about 0.2 mol of the former per mol of the latter.

3. The method of claim 2 wherein the mol ratio of said monoepoxide compound to said aromatic diprimary amine is from about 0.3 to about 0.5 mol of the former per mol of the latter.

4. The method of claim 1 wherein said monoepoxide compound is a monoglycidyl ether.

5. The method of claim 1 wherein said monoepoxide compound is allyl glycidyl ether, butyl glycidyl ether, phenyl glycidyl ether, glycidol, beta-(3,4-epoxycyclohexyl) ethyl trimethoxysilane or gamma-glycidoxypropyl trimethoxysilane.

6. The method of claim 1 wherein said aromatic diprimary amine has the formula $H_2NR'NH_2$ where R' is a divalent aromatic radical having the basic structure:

[structures]

where R" is —O—; —$CH_2$—; —$C(CH_3)_2$—;

—$C(X)_2$—

X being halogen, —S—; —S—S—; or —$SO_2$—.

7. The method of claim 6 wherein said aromatic diprimary amine is methylene bis orthochloroaniline.

8. The method of claim 6 wherein said monoepoxide compound is allyl glycidyl ether, butyl glycidyl ether, phenyl glycidyl ether, glycidol, beta (3,4-epoxycyclohexyl) ethyl trimethoxysilane or gamma-glycidoxypropyl trimethoxysilane.

9. The method of claim 8 wherein said monoepoxide compound is allyl glycidyl ether and wherein said aromatic diprimary amine is methylene bis orthochloroaniline.

10. The method of claim 8 wherein the mol ratio of said monoepoxide compound to said aromatic diprimary amine is from about 0.2 to about 0.2 mol of the former per mol of the latter.

11. The method of claim 8 wherein the mol ratio of said monoepoxide compound to said aromatic diprimary amine is from about 0.3 to about 0.5 mol of the former per mol of the latter.

12. The method of claim 1 wherein said monoepoxide compound is allyl glycidyl ether; wherein said aromatic diprimary amine is methylene bis orthochloroaniline, and wherein the mol ratio of the two is about 1:1.

13. An epoxy-modified, amine-curable urethane resin composition comprising a mixture of
an adduct of a monoepoxide compound and an aromatic diprimary amine in which the mol ratio is from about 0.05 to about 1 of the former per mol of the latter, and
a urethane prepolymer.

14. The composition of claim 13 wherein, in said adduct, the mol ratio of said monoepoxide compound to said aromatic diprimary amine is from about 0.2 to about 0.8 mol of the former per mole of the latter.

15. The composition of claim 14 wherein the mol ratio of said monoepoxide compound to said aromatic diprimary amine is from about 0.3 to about 0.5 mol of the former per mol of the latter.

16. The composition of claim 13 wherein said monoepoxide compound is a monoglycidyl ether.

17. The composition of claim 13 wherein said monoepoxide compound is allyl glycidyl ether, butyl glydicyl ether, phenyl glycidyl ether, glycidol, beta-(3,4-epoxycyclohexyl) ethyl trimethoxysilane or gamma-glycidoxypropyl trimethoxysilane.

18. The composition of claim 13 wherein said aromatic diprimary diamine has the formula $H_2NR'NH_2$ where $R'$ is a divalent aromatic radical having the basic structure:

or

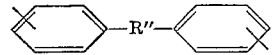

where $R''$ is $-O-$; $-CH_2-$; $-C(CH_3)_2-$;
$-C(X)_2-$
X being halogen; $-S-$; $-S-S-$ or $-SO_2-$.

19. The composition of claim 18 wherein said aromatic diprimary amine is methylene bis orthochloroaniline.

20. The composition of claim 18 wherein said monoepoxide compound is allyl glycidyl ether; butyl glycidyl ether, phenyl glycidyl ether, glycidol, beta (3,4-epoxycyclohexyl) ethyl trimethoxysilane or gamma-glycidoxypropyl trimethoxysilane.

21. The composition of claim 20 wherein said monoepoxide compound is allyl glycidyl ether and wherein aromatic diprimary amine is methylene bis orthochloroaniline.

22. The composition of claim 20 wherein the mol ratio of said monoepoxide compound to said aromatic diprimary amine is from about 0.2 to about 0.8 of the former per mol of the latter.

23. The composition of claim 22 wherein the mol ratio of said monoepoxide compound to said aromatic diprimary amine is from about 0.3 to about 0.5 mol of the former per mol of the latter.

24. The composition of claim 13 wherein said monoepoxide compound is allyl glycidyl ether; wherein said aromatic diprimary amine is methylene bis orthochloroaniline, and wherein the mol ratio of the two is about 1:1.

25. The composition of claim 13 wherein there is also present a small amount of an adhesion-promoting silane.

References Cited

UNITED STATES PATENTS

| | | | |
|---|---|---|---|
| 3,257,339 | 6/1966 | Hostettler et al. | 260—2.5 |
| 3,391,054 | 7/1968 | Lewis et al. | 161—186 |

DONALD E. CZAJA, Primary Examiner

M. J. WELSH, Assistant Examiner

U.S. Cl. X.R.

117—124 E, 138.8 A; 260—33.4 UR, 33.6 UB, 37 N, 47 CB, 75 NQ, 331

UNITED STATES PATENT OFFICE
CERTIFICATE OF CORRECTION

Patent No. 3,649,599  Dated March 14, 1972

Inventor(s) Frank D. Swanson and Norm Gregornik

It is certified that error appears in the above-identified patent and that said Letters Patent are hereby corrected as shown below:

Claim 2, line 3, delete "0.2" (second occurrence)

and substitute --0.8--.

Claim 10, line 3, delete "0.2" (second occurrence)

and substitute --0.8--.

Signed and sealed this 22nd day of August 1972.

(SEAL)
Attest:

EDWARD M. FLETCHER, JR.　　　　　　　　ROBERT GOTTSCHALK
Attesting Officer　　　　　　　　　　　　Commissioner of Patents